US012784602B2

(12) United States Patent
Hauret et al.

(10) Patent No.: US 12,784,602 B2
(45) Date of Patent: Nov. 3, 2026

(54) METHOD FOR SHARING DATA BETWEEN AERONAUTICAL EQUIPMENT, RELATED DATA SHARING ELECTRONIC SYSTEM AND COMPUTER PROGRAM

(71) Applicant: THALES, Meudon (FR)

(72) Inventors: Daniel Hauret, Merignac (FR); Thomak Leduc, Merignac (FR); Jaime Diaz-Pineda, Merignac (FR)

(73) Assignee: THALES, Meudon (FR)

( * ) Notice: Subject to any disclaimer, the term of this patent is extended or adjusted under 35 U.S.C. 154(b) by 286 days.

(21) Appl. No.: 18/530,958

(22) Filed: Dec. 6, 2023

(65) Prior Publication Data

US 2024/0190582 A1 Jun. 13, 2024

(30) Foreign Application Priority Data

Dec. 7, 2022 (FR) ....................................... 2212912

(51) Int. Cl.
*B64D 45/00* (2006.01)

(52) U.S. Cl.
CPC ...... *B64D 45/00* (2013.01); *B64D 2045/0085* (2013.01)

(58) Field of Classification Search
None
See application file for complete search history.

(56) References Cited

U.S. PATENT DOCUMENTS

2007/0130599 A1 6/2007 Monroe
2013/0046422 A1* 2/2013 Cabos .................. G06Q 10/047 701/120
2017/0011635 A1* 1/2017 Whitlow ................ G01C 23/00

OTHER PUBLICATIONS

Théodoreletouzé, LisaCréno, JaimeDiaz-Pineda, SylvainHourlier, Jean-MarcAndré. A New HMI Evaluation Method (MERIA) Based on Pilot's Mental Representations. 20th International Symposium on Aviation Psychology (ISAP2019), May 2019, Dayton, OH, United States. pp.355-360.
FR 2212912, INPI Rapport de Recherche Preliminaire, Jul. 3, 2023, 2 pages.

* cited by examiner

*Primary Examiner* — Hitesh Patel
*Assistant Examiner* — Wenyuan Yang
(74) *Attorney, Agent, or Firm* — Soquel Group LLC

(57) ABSTRACT

A method sharing data between aeronautical equipment items. At least one equipment item is included in an aircraft carrying out a flight mission. The method includes obtaining a set of data coming from said equipment item. The method further includes adding of the set of data to a common group including data common to all aeronautical equipment items. The method incudes filtering the data of the common group in order to determine at least one first relevant datum for successfully completing the flight mission. The method incudes transmitting, to at least one other equipment item, of only the at least first relevant datum to be used for a display to a respective user, or for a computation, of a command of the aircraft.

6 Claims, 5 Drawing Sheets

METHOD FOR SHARING DATA BETWEEN AERONAUTICAL EQUIPMENT, RELATED DATA SHARING ELECTRONIC SYSTEM AND COMPUTER PROGRAM

CROSS-REFERENCE TO RELATED APPLICATIONS

This application is a U.S. non-provisional application claiming the benefit of French Application No. 22 12912, filed on Dec. 7, 2022, which is incorporated herein by reference in its entirety.

TECHNICAL FIELD OF THE INVENTION

The present invention relates to a method for sharing data between equipment items.

The present invention further relates to an electronic system for sharing data between equipment items and a computer program configured to implement such a method.

The invention relates to the field of communication between equipment items.

BACKGROUND OF THE INVENTION

During a flight mission of an aircraft, a plurality of agents is involved. Indeed, during their flight, an aircraft pilot is at least in communication with an air traffic controller with whom the pilot can exchange data on their flight mission. During such communications, as a general rule, each user requests the data they need from their counterpart in order to check that the situation is according to a flight plan or to determine different commands related to the aircraft. Following the request, the counterpart consults avionics equipment providing them with the requested data and transfers the data to the first user, by speech or via digital communication between the equipment items. With such type of communication protocol, the data are called pulled data. In other words, the data requester initiates the communication protocol. Or still, it is the data requester who has to indicate their need for data to be provided, with the data provider responding only to the requester's requests.

Such a mechanism can prove to be sufficient when only an aircraft pilot and an air traffic controller communicate with each other, and the situation is not critical. However, as soon as more agents are involved, the amount of information requested makes the communications too slow. Similarly, when the situation is critical, e.g. for the management of a failure, the speed of transfer of information is a key factor that discriminates conventional communication protocols.

To overcome such problem, the push data mechanism is known. Indeed, in this mechanism, the information from each equipment item is transmitted in full to the other equipment items without a prior request for data being needed. Thereby, the user of a respective equipment does not need to indicate their need for the desired data to be transmitted to them. Such mechanism thus serves to reduce the time required to acquire data for each user.

However, as soon as the number of users involved exceeds two or as soon as the situation becomes critical, the amount of data available to each user is too large for the user to have the time to process data, to determine which data the user needs. Furthermore, too much data available increases the cognitive load of users, and even enhances a feeling of panic among the users of the different equipment items, which can lead to late or erroneous decision making.

In addition, the communication of too much data is likely to overload the communication channels between equipment items, leading to delays in acquiring the data.

SUMMARY OF THE INVENTION

The goal of the invention is to overcome such problem by limiting the amount of information made available to the users.

To this end, the subject matter of the present invention is a method for sharing data between equipment items, at least one equipment item being included in an aircraft, the aircraft implementing a flight mission, the method being implemented by an electronic data sharing system and including the following successive steps for one of the aeronautical equipment items:

- obtaining a set of data from the equipment item, at least one datum from the set of data derived from a sensor associated with the equipment item,
- addition of the set of data to a common group, the common group including data common to all aeronautical equipment items,
- filtering of the data of the common group via mission-specific filtering rules, so as to determine at least one first relevant datum, the at least one first relevant datum being relevant for the completion of the flight mission, and
- transmission, to at least one other equipment item, of only the first at least one relevant datum to be used among: a display to a respective user of the other equipment item and computing, by another equipment item, of a command of the aircraft.

The filtering step serves for sorting all the data so as to obtain only the data relevant to the mission in progress. In other words, only the data which each user and/or equipment item has to know about are determined and transmitted to each equipment item.

With the method according to the invention, the method according to the invention improves the level of knowledge of each equipment item and/or associated user, by means of the push data mechanism, without thereby overloading each equipment item and/or user.

As an optional supplement, the method includes one or a plurality of the following features, taken individually or according to all technically possible combinations:

- the mission is the management of an anomaly in an aircraft environment,
- during the filtering step, a respective predefined filtering rule is intended to obtain the data needed for the development of a corrective action to be implemented by the aircraft in order to manage the anomaly in the environment of the aircraft,
- the anomaly belongs to a predefined set of anomaly(ies), for each anomaly, a set of corrective action(s) and a set of filtering rule(s) are predefined,
- the mission is the management of an engine failure during an aircraft flight, another equipment item being included in an air traffic control tower, the set of data coming from the equipment item included in the aircraft including:
  - a speed of the aircraft,
  - an altitude of the aircraft,
  - a position of the aircraft,
  - a flight time to an initial destination of the aircraft,
  - a quantity of fuel in the aircraft,
  - a pressure in each engine of the aircraft,
  - a power of each engine of the aircraft, a ventilation status of a cabin of the aircraft, and an element relating to the passengers of the aircraft, the set of data from the equipment item included in the air traffic control tower including:

an indication of traffic in a zone around the aircraft, a delimitation of a zone prohibited for overflying, a radio communication channel with a pilot of the aircraft, and meteorological information in an aircraft environment, a predefined corrective action being the planning of a flight plan following the engine failure, a predefined filtering rule being intended to determine the data needed for the planning of the flight plan, and at least one first relevant datum including:

the speed of the aircraft, the altitude of the aircraft, the position of the aircraft, the flight time to an initial destination of the aircraft, the amount of fuel in the aircraft, the pressure in each engine of the aircraft, the power of each engine of the aircraft, the indication of traffic in a zone around the aircraft, and the delimitation of a zone prohibited for overflying, the anomaly is a fire in an aircraft environment, the aircraft being a Canadair®, another equipment item being associated with a fire department on the ground, the set of data coming from the equipment item included in the aircraft included:

a speed of the aircraft, an altitude of the aircraft, a position of the aircraft, a bombing status of the water stored in an aircraft tank, a quantity of fuel in the aircraft, and a quantity of water in the aircraft tank, the set of data coming from the equipment item associated with the fire department on the ground, including:

a position of the fire, a direction of the wind at the site of the fire, at least one terrain feature at the site of the fire, and a position of firefighters on the ground, a predefined corrective action being the determination of an axis of bombing of the water stored in the aircraft tank for extinguishing the fire, a predefined filtering rule being intended to determine the data needed for the determination of the axis of bombing, at least one first relevant datum including:

the position of the aircraft, the bombing status of the water stored in the aircraft tank, the position of the fire, the wind direction at the site of the fire, at least one terrain feature at the site of the fire, and the position of firefighters on the ground, the obtaining step includes the sub-steps of:

receiving data from sensor(s) associated with the equipment item and/or determined by the equipment item, selection of second relevant data from the received data, the second relevant data being relevant for a user of the equipment item, for the purpose of controlling the equipment item within the framework of the mission, and formation of the set of data coming from the equipment item by concatenation of the second selected relevant data, the obtaining and addition steps are iterated for each equipment item, prior to the filtering step, during the addition step, the respective set of data from each aeronautical equipment item is added to the same data group common to all aeronautical equipment items, and at least two of the aeronautical equipment items are associated with the mission, the method further including, following the transmission step and for the at least one other equipment item associated with the mission, an enrichment step during which the at least one relevant primary datum is added to the respective set of data of at least one other equipment item.

The invention further relates to a computer program including, software instructions which, when executed by a computer, implement a method as described hereinabove.

A further subject matter of the invention is an electronic system for sharing data between aeronautical equipment items, at least one equipment item being included in an aircraft, the aircraft carrying out a flight mission, the electronic sharing system including, for one of the aeronautical equipment items:

an obtaining module configured to obtain a set of data from the equipment item, at least one datum from the set of data derived from a sensor associated with the equipment item, an addition module configured to add the set of data to a common group, the common group containing data common to all aeronautical equipment items, a filtering module configured to filter the data of the common group via mission-specific filtering rules, so as to determine at least one first relevant datum, the at least one first relevant datum being relevant for the completion of the flight mission, and a transmission module configured to transmit to at least one other equipment item only the at least first relevant datum to be used among: a display to a respective user of the other equipment item and computing, by another equipment item, a command of the aircraft.

As an optional supplement, the system includes the following feature:

the electronic sharing system is a decentralized system including, a plurality of elementary electronic devices, the obtaining, addition, filtering and transmission modules being included in at least two separate elementary electronic devices.

BRIEF DESCRIPTION OF THE DRAWINGS

Such features and advantages of the invention will become clearer upon reading the following description, given only as a non-limiting example, and made with reference to the enclosed drawings.

DETAILED DESCRIPTION

Figure 1:
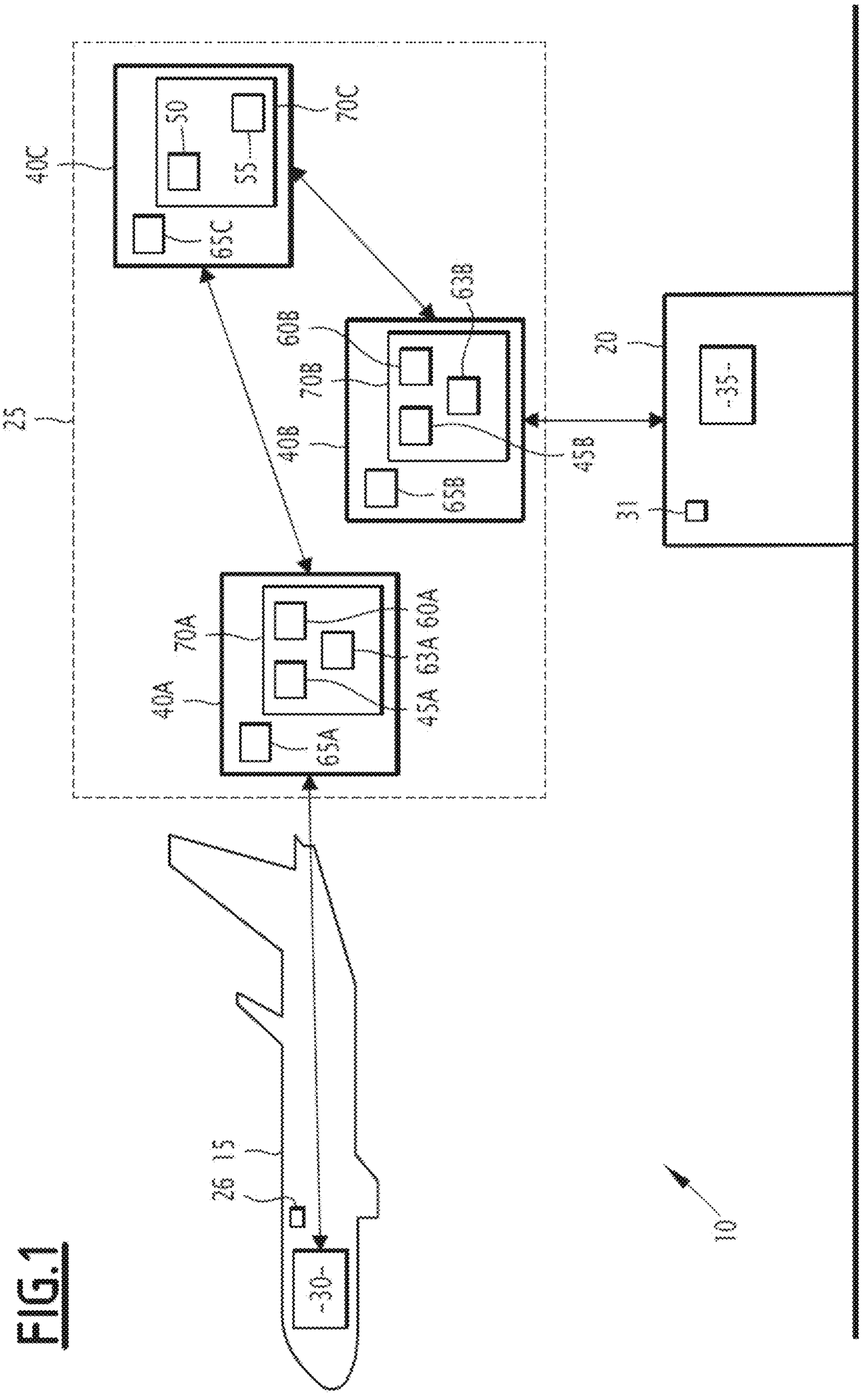
FIG. 1 is a schematic view of an aeronautical system including, a data sharing system according to the invention.

FIG. 1 shows an aeronautical the 10 according to a first embodiment. The aeronautical system 10 includes at least one aircraft 15, a ground station 20 and an electronic data sharing system 25.

The aeronautical system 10 implements a mission. The mission is e.g. the management of an anomaly in an environment of the aircraft 15. To successfully complete such mission, the aircraft 15 and the ground station 20 are apt to implement one or a plurality of corrective actions.

For example, the anomaly belongs to a predefined set of anomalies. For each anomaly, a set of corrective action(s) and a set of filtering rule(s) are predefined.

The aircraft 15 is typically an airplane, a helicopter, or a drone. Preferentially, the aircraft 15 is a plane, e.g. a commercial aircraft.

The anomaly is typically any type of hazard, i.e. unforeseen event, relating to the aircraft 15 and/or the ground station 20, and justifying communication between the aircraft 15 and the ground station 20.

According to a first example, the anomaly is an engine failure of the aircraft 15. The ground station 20 is an air traffic control tower.

According to a second example, the anomaly is a fire in an environment of the aircraft 15. The aircraft 15 is a Canadair®. The ground station 20 is then a ground firefighter service.

According to a third example, the anomaly is a sick passenger in a critical condition on-board the aircraft 15.

According to a fourth example, the anomaly is a request from ground station 20 that aircraft 15 leaves a group of aircraft that same had been flying alongside until then.

According to a fifth example, the anomaly is a victim of a mountain injury. Aircraft 15 is a rescue helicopter, and ground station 20 is a fire and emergency service team on the ground.

The aircraft 15 includes a plurality of sensors 26 suitable for measuring different data related to the aircraft 15. The aircraft 15 includes a first equipment item 30 receiving the data measured by the sensors 26, computing other data and storing the measured and computed POP_A data (standing for Personal Operational Picture).

The ground station 20 is apt to communicate with the one or a plurality of aircraft 15 and with the sharing system 25.

The first equipment item 30 is e.g. a flight management system (FMS) of the aircraft 15. Among the POP_A data stored in the first equipment item 30, certain data are relevant for a user of the first aeronautical device 30, i.e. a pilot of the aircraft 15. The data form a first set of PROP_A data (Personal Relevant Operational Picture). "Data relevant for the user" means data which are useful or necessary to the user of the equipment item in order to accomplish the mission. The first set of PROP_A data relates to the first equipment item 30.

Like the aircraft 15, the ground station 20 further includes sensors 31 suitable for measuring data relating to the ground station 20 or to an environment of the aircraft 15. The ground station 20 further includes a second equipment item 35 receiving the data measured by the sensors 31, computing other data and storing the measured and computed POP_B data.

Each equipment item 30, 35 optionally includes a display screen suitable for displaying data received from the sharing system 25 as will be described hereinafter.

Preferentially, each equipment item 30, 35 is further, or in a variant, instead, configured to compute commands from the aircraft 15 from the data received from the sharing system 25.

According to the first example, the second equipment item 35 is an electronic air traffic control device. A user of the second equipment item 35 is an air traffic controller.

According to the second example, the second equipment items 35 is a concentration system for service data for firefighters. The user of the second equipment item 35 is a firefighter.

Amongst the data stored in the second equipment item 35, certain data are relevant for the user and form a second set of PROP_B data.

The electronic data sharing system 25 includes a plurality of elementary electronic devices 40. In the example shown in FIG. 1, the data sharing system 25 includes a first 40A, a second 40B and a third 40C elementary devices.

The sharing system 25 includes at least one module 45 for obtaining a set of PROP_A, PROP_B data from one of the equipment items 30, 35, an addition module 50, a filtering module 55, at least one transmission module 60, and preferentially at least one enrichment module 63.

In the example shown in FIG. 1, the sharing system 25 includes a first obtaining module 45A, a first transmission module 60A, and preferentially a first enrichment module 63A included in the first elementary device 40A. The sharing system 25 further includes a second obtaining module 45B, a second transmission module 60B and preferentially a second enrichment module 63B included in the second elementary device 40B. The addition module 50 and the filtering module 55 are included in the third elementary device 40C distinct from the first 40A and second 40B elementary devices.

The first elementary device 40A is connected to the first equipment item 25 and to the third elementary device 40C. The second elementary device 40B is connected to the second equipment item 30 and to the third elementary device 40C.

According to an embodiment (not shown), the first elementary device 40A is included in the aircraft 15, and the second elementary device 40B is included in the ground system 20.

In the example shown in FIG. 1, each elementary device 40A, 40B, 40C is a computer including, a processor 65A, 65B, 65C, respectively, and a memory 70A, 70B, 70C associated with the processor 65A, 65B, 65C and storing software instructions apt to be executed by the processor 65A, 65B, 65C.

In FIG. 1, the modules 45A, 45B, 50, 55, 60A, 60B, 63A, 63B are each implemented in the form of one or a plurality of software programs, or a software brick, executable by the respective processor 65A, 65B, 65C.

Furthermore, each software program is apt to be recorded on a computer-readable medium (not shown).

The computer-readable medium is e.g. a medium apt to store electronic instructions and to be coupled to a bus of a computer system. As an example, the readable medium is an optical disk, a magneto-optical disk, a ROM memory, a RAM memory, any type of non-volatile memory (e.g. EPROM, EEPROM, FLASH, NVRAM), a magnetic card or an optical card. A computer program containing software instructions is then stored on the or each readable medium.

In a variant (not shown), each module 45A, 45B, 50, 55, 60A, 60B, 63A, 63B, or each elementary device 40A, 40B, 40C, or even the entire data sharing system 25 is produced in the form of a programmable logic component, such as an FPGA (Field Programmable Gate Array), or further of integrated circuit, such as an ASIC (Application Specific Integrated Circuit).

Each obtaining module 45A, 45B is configured to obtain the set of PROP_A, PROP_B data from the equipment items 30, 35 with which same is associated.

The first obtaining module 45A is configured to obtain the first set of PROP_A data from the first equipment item 30 and the second obtaining module 45B is configured to obtain the second set of PROP_B data from the second equipment item 35.

In the first example, the first set of PROP_A data includes: a speed of the aircraft 15, an altitude of the aircraft 15, a position of the aircraft 15, a flight time to an initial destination of the aircraft 15, an amount of fuel in the aircraft 15, a pressure in each engine of the aircraft 15, and a power of each engine of the aircraft 15.

In the first example, the second set of PROP_B data includes: an indication of the traffic in a zone around the aircraft 15, a delimitation of a zone prohibited for overflying, a radio communication channel with a pilot of the aircraft 15, and meteorological information in an environment of the aircraft 15.

In the second example, the first set of PROP_A data includes: a speed of the aircraft 15, an altitude of the aircraft 15, a position of the aircraft 15, an amount of fuel in the aircraft 15, the bombing status of water stored in a tank of the aircraft 15, and an amount of water in the tank of the aircraft 15.

In the second example, the second set of PROP_B data includes: a position of the fire, a wind direction at the site of the fire, at least one terrain feature at the site of the fire, and a position of the firefighters on the ground.

The addition module 50 is configured to add the set of PROP_A, PROP_B data coming from one of the obtaining modules 45A, 45B, to a COP common group (Common Operational Picture) of data common to all the equipment items 30, 35.

Preferentially, the addition module 50 is configured to add each set of PROP_A, PROP_B data to the COP common group.

For example, the addition module 50 is configured to perform a concatenation of the sets of PROP_A, PROP_B data with the data already contained in the COP common group.

In the first example, the COP common group includes the following data: the speed of the aircraft 15, the altitude of the aircraft 15, the position of the aircraft 15, the flight time to an initial destination of aircraft 15, fuel quantity in aircraft 15, the pressure in each engine of the aircraft 15, the power of each engine of the aircraft 15, the ventilation status of a cabin of the aircraft 15, an element relating to the passengers of the aircraft 15, the indication of traffic in a zone around the aircraft 15, the delimitation of a zone prohibited for overflying, the radio communication channel with a pilot of the aircraft 15, the meteorological information in an environment of the aircraft 15, and information on other priority aircraft in an environment of the ground station 20.

In the second example, the COP common group includes the following data: the speed of the aircraft 15, the altitude of the aircraft 15, the position of the aircraft 15, the amount of fuel in the aircraft 15, the bombing status of water stored in the tank of the aircraft 15, the amount of water in the tank of the aircraft 15, the position of the fire, the wind direction at the site of the fire, at least one field feature at the site of the fire, and the position of firefighters on the ground.

Preferentially, the addition module 50 is configured to update the data included in the COP common group from the data present in the set of PROP_A, PROP_B data, if the data of at least one set of PROP_A, PROP_B data include data concerning elements already present in the COP common group.

In other words, in the first example, the addition module 50 is configured to update the position of the aircraft 15 from the position present in the first set of PROP_A data, if the COP common group already includes a position of the aircraft 15.

The filtering module 55 is configured to filter the data of the COP common group via filtering rules specific to the mission, to determine at least one common relevant datum (standing for Common Relevant Operational Picture), also called shared relevant CROP datum or first relevant datum.

The at least one common relevant CROP datum is relevant for all equipment items 30, 35 of the avionics system 10 and/or for all users of the equipment items 30, 35, in order to successfully complete the mission.

In particular, each filtering rule is preferentially defined by users planning the missions and corrective actions to be implemented in order to accomplish the missions. Thereby, each filtering rule is e.g. associated with a corrective action.

In the first example, a corrective action is the planning of a flight plan following the engine failure, a predefined filtering rule being intended to determine the data needed for the planning of the flight plan.

In the second example, a predefined corrective action is the determination of an axis of bombing of the water stored in the tank of Canadair® for firefighting, a predefined filtering rule being intended to determine the data needed for the determination of the axis of bombing.

The filtering module 55 is more precisely configured to compute, for each datum of the COP common group, a relevance indicator on the basis of predefined filtering rules specific to the mission.

Such filtering rules are suitable for associating with each datum, a predefined indicator according to the importance, also called relevance, of the datum for all users of equipment items 30, 35, in order to implement the associated corrective action. The predefined indicator is e.g. a numerical value, such as a number between 0 and 100, where the minimum value 0 corresponds to a datum of little relevance to all users, and the maximum value 100 corresponds to a datum which is extremely relevant for all users.

As an example, in the first example, the predefined indicator associated with a quantity of fuel in the aircraft 15 takes the value 100, while the indicator associated with the indication of enabled autopilot takes the value 0. In this way it is possible to realize that the quantity of fuel in the aircraft 15 is much more important for all users than the indication of enabled autopilot, for the planning of the flight plan following the engine failure.

Preferentially, in the first example, the predefined indicator associated with the speed of the aircraft 15 takes the value 81.

Furthermore, the filtering module 55 is configured to compare the relevance indicator to a predefined threshold. A threshold value is chosen according to the quantity of data that it is desired to transmit to equipment items, as described thereafter. The filtering module 55 is configured to determine, the common relevant datum or CROP data, as being the datum or data of the COP common group, for which the relevance indicator is greater than or equal to the threshold. In the first example detailed hereinabove, the threshold value is e.g. set at 50.

In the first example, the common relevant CROP data include: the speed of the aircraft 15, the altitude of the aircraft 15, the position of the aircraft 15, the flight time to an initial destination of the aircraft 15, the amount of fuel in the aircraft 15, the pressure in each engine of the aircraft 15, the power of each engine of the aircraft 15, the indication of traffic in a zone around the aircraft 15 and the delimitation of a zone prohibited for overflying.

In the second example, the common relevant CROP data include: the position of the fire, the wind direction at the site of the fire, at least one terrain feature at the site of the fire, and the position of the firefighters on the ground.

The first transmission module 60A is configured to transmit only the common relevant CROP data to the first equipment items 30. The second transmission module 60 B is configured to transmit only the common relevant CROP data to the second equipment items 35.

Advantageously, each transmission module 60A, 60B is configured to transmit to each equipment item 30, 35 only the common relevant CROP data which does not originate from the equipment items 30, 35.

Each enhancement module 63A, 63B is configured to add the common relevant CROP data to the set of PROP_A, PROP_B data of the corresponding equipment items 30, 35.

As an optional supplement, the first enhancement module 63A is configured to add to the first set of PROP_A data of the first equipment item 30 only the common relevant CROP data that are not already present in the first equipment item 30, i.e. the common relevant CROP data coming from the second set of PROP_B data of the second equipment item 35. The first enrichment module 63A is configured to update the datum from the new datum of the common relevant CROP data coming the second set of PROP_B data, if the first set of PROP_A data includes data relating to the second equipment 35 coming from a previous enrichment.

According to the optional supplement, the second enhancement module 63B is configured in a similar manner to the first enhancement module 63A by replacing the first equipment item 30 by the second equipment item 35 and the first set of PROP_A data by the second set of PROP_B data.

As an optional supplement, each obtaining module 45A, 45B is configured to obtain the set of PROP_A, PROP_B data in the following way, explained for the first obtaining module 45A.

The first obtaining module 45A is configured to receive the POP_A data stored in the first equipment item 30, i.e. the POP_A data coming from sensor(s) 26 associated with the equipment item 30 and/or determined by the first equipment item 30.

The first obtaining module 45A is further configured to select, from the received POP_A data, individual relevant data, also called local relevant data or second relevant data.

The individual relevant data are related to the first equipment item 30. The individual relevant data is relevant for the user of the first equipment item 30, in order to control the first equipment item 30 within the framework of the mission.

Preferentially, the first obtaining module 45A is configured to apply a methodology called MERIA in which the operators of the aircraft 15 and of the ground station 20 have each predefined, for each mission, the information considered to be necessary for them. For example, the information forms a predefined column vector. Thereby, the first obtaining module 45A is configured to select, among the received POP_A data, the individual relevant data as being the received data corresponding to the data indicated in the predefined column vector.

The first obtaining module 45A is further configured to form the first set of PROP_A data by concatenation of the selected individual relevant data.

According to such optional supplement, the second obtaining module 45 B is configured in a similar way to the first obtaining module 45A, except that same is configured to receive the POP_B data from the second equipment item 35, to select from the POP_B data, the data that are relevant for the user of the second equipment item 35, and to form the second set of PROP_B data.

Figure 2:
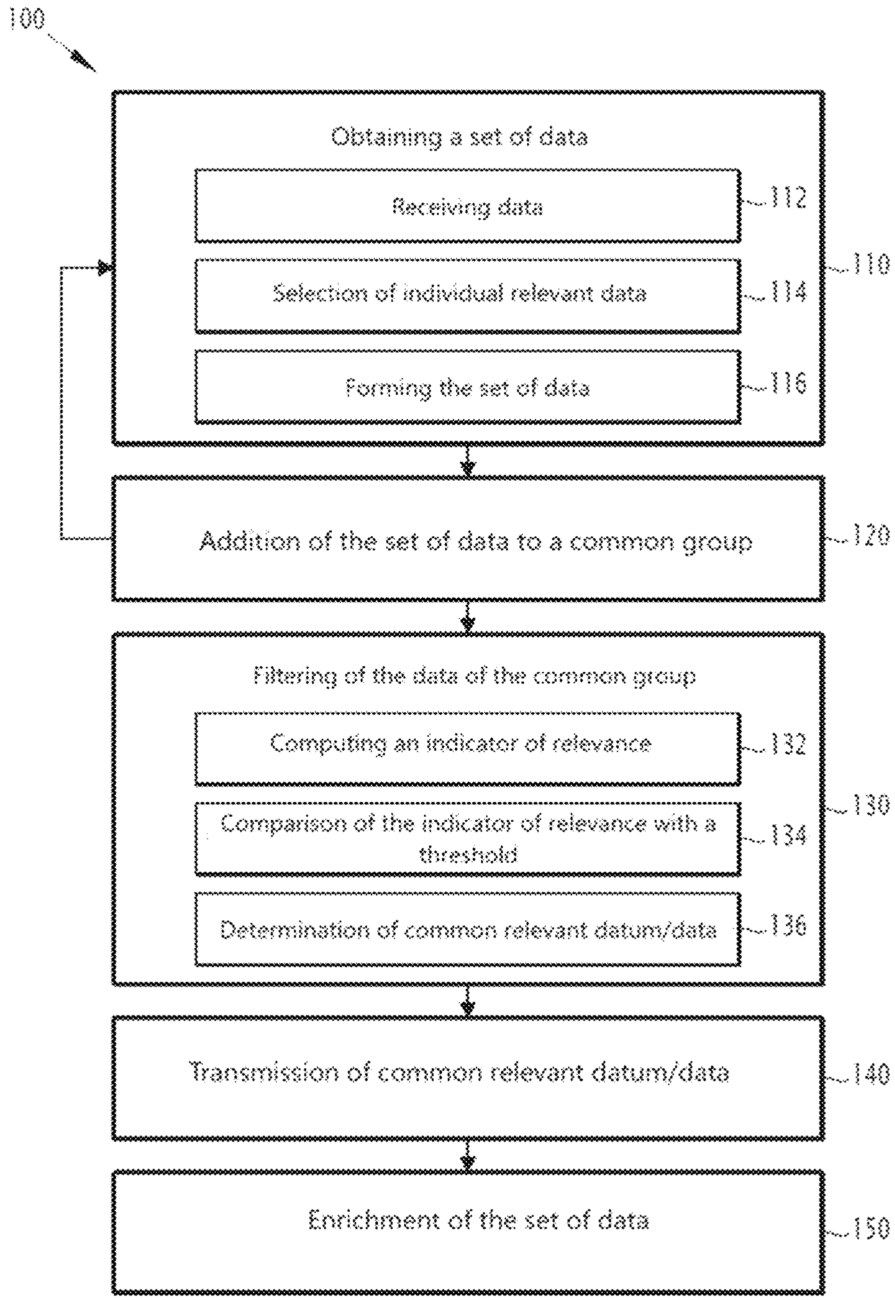
FIG. 2 is a flow chart of a method of sharing data according to the invention.
Figure 3:
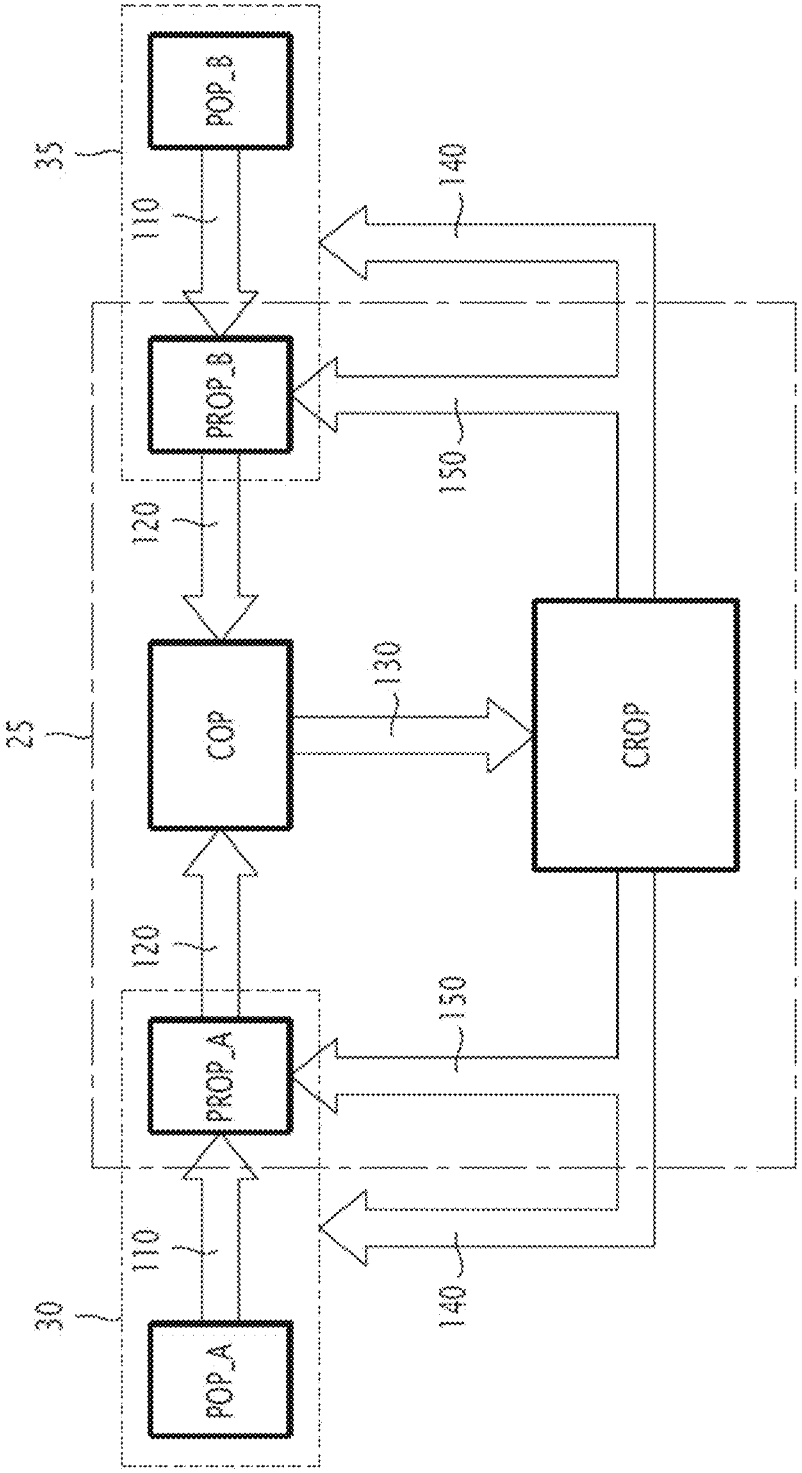
FIG. 3 is a diagram representing data exchanges in the data sharing system shown in FIG. 1.

The operation of the electronic sharing system 25 will now be described with reference to FIG. 2 representing a flow chart of a data sharing method 100, and to FIG. 3 representing the data flows during the method 100.

Firstly, the operation of the sharing system 25 is described on the basis of the first example.

Initially, the aircraft 15 flies and is apt to communicate with the ground station 20 and the sharing system 25.

At a given instant, the anomaly occurs. The anomaly is e.g. an engine failure of the aircraft 15. In such example, the first equipment item 30 is a flight computer of the aircraft 15. Also in the example, the ground station 20 is an air traffic control tower, the second equipment item 35 being included in the air traffic control tower 20.

During an obtaining step 110, the first obtaining module 45A obtains the first set of PROP_A data coming from the first equipment item 25.

Preferentially, the obtaining step 110 includes a reception sub-step 112 during which the first obtaining module 45A receives the POP_A data stored in the first equipment item 30, from the first equipment item 30.

The obtaining step 110 further includes a selection sub-step 114 during which the first obtaining module 45A selects, from among the received POP_A data, the individual relevant data associated with the first equipment item 30, as described hereinabove.

Preferentially, during the selection sub-step 114, the obtaining module 45A selects the individual relevant data associated with the first equipment items 30 as being the data corresponding to the predefined column vector established by the operator of the first equipment item 30 prior to the mission.

The obtaining step 110 finally includes a sub-step 116 of forming the first set of PROP_A data, from the individual relevant data. For example, the first obtaining module 45A is configured to concatenate the individual relevant data associated with the first equipment item 30, so as to form the first set of PROP_A data.

In FIG. 3, the POP_A data received from the first equipment item 30 are represented on the left and the step 110 is represented by the arrow joining the POP_A data to the first set of PROP_A data.

In the first example, the POP_A data received from the first equipment item 30 include: the speed of the 15, the altitude of the aircraft 15, the position of the aircraft 15, the flight time to an initial destination of the aircraft 15, the indication of enabled autopilot, the amount of fuel in the aircraft 15, the pressure in each engine of the aircraft 15, the power of each engine of the aircraft, the angle of attack of the aircraft 15, a position of the landing gears of the aircraft 15, a position of the flaps on the wings of the aircraft 15, a condition of an electrical generator of the aircraft 15, an oil pressure in the engine(s) of the aircraft 15, a ground temperature at the original destination of the aircraft 15, the ventilation condition of a cabin of the aircraft 15, and the element relating to the passengers of the aircraft 15.

In the first example, the first set of PROP_A data includes: the speed of the aircraft 15, the altitude of the aircraft 15, the position of the aircraft 15, the flight time to an initial destination of the aircraft 15, the amount of fuel in the aircraft 15, the pressure in each engine of the aircraft 15, the power of each engine of the aircraft, the ventilation status of a cabin of the aircraft 15, and the element relating to the passengers of the aircraft 15.

The method 100 further includes an addition step 120 during which the addition module 50 adds the first set of PROP_A data to the COP common group as described hereinabove.

Preferentially, during the addition step 120, if the data of the first set of PROP_A data include data relating to elements already present in the COP common group, the addition module 50 updates the data from the data present in the first set of PROP_A data. "Updating a datum of the COP common group" means the deletion of the previous datum already contained in the COP common group, and the replacement thereof by the corresponding datum of the set of PROP_A data.

In FIG. 3, the addition step 120 is represented by the arrow linking the first set of PROP_A data to the COP common group.

The method further includes a filtering step 130 during which the filtering module 55 filters the data of the COP common group so as to determine the common relevant CROP data.

To this end, the filtering step 130 includes a computation sub-step 132 during which the filtering module 55 computes a relevance indicator for each datum of the COP common group. For this purpose, the filtering module 55 uses the predefined filtering rules as described hereinabove.

The filtering step 130 then includes a sub-step 134 of comparison between the relevance indicator computed for each datum of the COP common group and the predefined threshold.

Finally, the filtering step 130 includes a determination sub-step 136 during which the filtering module 55 determines the common relevant CROP datum/data as being the datum/data the relevance indicator of which is higher than the predefined threshold.

In FIG. 3, the filtering step 130 is represented by the downward arrow connecting the COP common group to the common relevant CROP datum/data.

The method further c includes a transmission step 140 during which the second transmission module 60B transmits only the common relevant CROP data to the second equipment item 35.

Preferentially, the method 100 includes, prior to the filtering step 130, the iteration of the obtaining 110 and addition 120 steps for each equipment item 30, 35. Thereby, in the present case, the obtaining 110 and addition 120 steps are also reiterated for the second equipment item 35. The steps 110, 120 are similar except in what follows. During the reiterated obtaining step 110, the second obtaining module 45B obtains the second set of PROP_B data of the second equipment item 35, e.g. by receiving the POP_B data of the second equipment item 35, by selecting the individual relevant data associated with the second equipment item 35 and forming the second set of PROP_B data by concatenation of the individual relevant data. During the addition step 120, the addition module 50 adds the second set of PROP_B data to the COP common group.

The iteration is shown on the right-hand part of FIG. 3. In particular, the POP_B data coming from the second equipment item 35 are represented on the right and the iteration of the obtaining step 110 is represented by the arrow going from right to left and connecting the POP_B data to the second set of PROP_B data.

In the first example, the POP_B data coming from the second equipment item 35 include: the indication of the traffic in a zone around the aircraft 15, the delimitation of a zone prohibited for overflying, the radio communication channel with a pilot of the aircraft 15, the meteorological information in an environment of the aircraft 15, and a position of other aircraft on the edge of airspace, and a weather in a ground station environment 20.

In the first example, the second set of PROP_B data includes: the indication of the traffic in a zone around the aircraft 15, the delimitation of a zone prohibited for overflying, the radio communication channel with a pilot of the aircraft 15, and the meteorological information in an environment of the aircraft 15.

The iteration of the addition step 120 is represented by the arrow going from right to left and connecting the second set of PROP_B data to the COP common group.

Preferentially, the obtaining step 110 and the reiterated obtaining step 110 are implemented simultaneously by the first 45A and second 45B obtaining modules. Similarly, the addition step 120 and the reiterated addition step 120 are implemented simultaneously by the addition module 50.

Thus, in the first example, the COP common group includes: the speed of the aircraft 15, the altitude of the aircraft 15, the position of the aircraft 15, the flight time to an initial destination of the aircraft 15, the quantity of fuel in the aircraft 15, the pressure in each engine of the aircraft 15, the power of each engine of the aircraft 15, the ventilation status of a cabin of the aircraft 15, the element relating to the passengers of the aircraft 15, the indication of traffic in a zone around the aircraft 15, the delimitation of a zone prohibited for overflying, the radio communication channel with a pilot of the aircraft 15, and the meteorological information in an environment of the aircraft 15.

It should be the understood that in the first example, the common relevant CROP data include: the speed of the aircraft 15, the altitude of the aircraft 15, the position of the aircraft 15, the flight time to an initial destination of the aircraft 15, the amount of fuel in the aircraft 15, the pressure in each engine of the aircraft 15, the power of each engine of the aircraft 15, the indication of traffic in a zone around the aircraft 15 and the delimitation of a zone prohibited for overflying.

Thus, during the transmission step 140, the first transmission module 60A transmits only the common relevant CROP data to the first equipment item 30.

Preferentially, the first transmission module 60A transmits to the first equipment 30 only the common relevant CROP data which are not already stored in the first equipment item 30, i.e. the common relevant CROP data coming from the second equipment item 35.

Similarly, the second transmission module 60B transmits to the second equipment item 35 only the common relevant CROP data which are not already stored in the second equipment item 35, i.e. the common relevant CROP data coming from the first equipment item 30.

As an optional supplement, the method 100 includes an enrichment step 150 during which the enrichment modules 63A, 63B enrich the sets of PROP_A, PROP_B data by adding the common relevant CROP data thereto.

Preferentially, the first enhancement module 63A adds to the first set of PROP_A data, the common relevant CROP data that do not come from the first equipment item 30, i.e. that come from the second equipment item 35. Similarly, the second enhancement module 63B adds to the second set of PROP_B data, the common relevant CROP data which does not come from the second equipment item 35, i.e. which comes from the first equipment item 30.

In FIG. 3, the enrichment step 150 is represented by the two arrows 150 linking the common relevant CROP datum/data to the sets of PROP_A, PROP_B data.

Then, each equipment item 30, 35 displays the common relevant CROP data intended for the user of the equipment items 30, 35.

According to a first variant of operation, each equipment item 30, 35 use the common relevant data to compute a command of the aircraft 15, such as a flight command of the aircraft 15.

According to a second variant of operation, one of the equipment items 30, 35 displays the common relevant CROP data, while the other equipment item 30, 35 uses the common relevant CROP data for computing a command of the aircraft 15, such as a flight command of the aircraft 15.

According to a third variant, the sharing system 25 is concentrated in a single electronic device 40 apt to communicate with each equipment item 30, 35. The sharing system 25 then includes a single obtaining module 45 configured so as to cumulate the configurations of the first 45A and second 45 B obtaining modules. Similarly, the sharing system 25 includes a single transmission module 60 and optionally a single enrichment module 63, each configured to cumulate the configurations of the first 60A and second 60B transmission modules and of the first 63A and second 63 B enrichment modules, respectively.

The method 100 applies in a similar way to the second example, with the differences hereinbelow.

In the second example, the aircraft 15 is a Canadair® and the ground station 20 is a concentration system for service data for firefighters. The anomaly is a fire starting in the environment of the aircraft 15. The mission is the management of the fire, and one of the corrective actions is the determination of an axis of bombing of the water contained in the Canadair®.

In the second example, the POP_A data received from the first equipment item 15 include: the speed of the aircraft 15, the altitude of the aircraft 15, the position of the aircraft 15, the flight time to the fire, the indication of enabled autopilot, the quantity of fuel in the aircraft 15, the pressure in each aircraft engine 15, the power of each aircraft engine, the angle of attack of the aircraft 15, the bombing status of water stored in the tank of the aircraft 15, and the amount of water in the tank of the aircraft 15.

The POP_B data received from the second equipment item 20 include: the position of the fire, the wind direction at the site of the fire, at least one terrain feature at the site of the fire, the position of the fire fighters on the ground, a number of agents mobilized on the ground, a number of vehicles mobilized, a slope of the ground at the site of the fire, a total surface area of terrain likely to be affected by the fire, and an amount of water available in tanks around the fire.

The first set of PROP_A data then includes: the speed of the aircraft 15, the altitude of the aircraft 15, the position of the aircraft 15, the quantity of fuel in the aircraft 15, the bombing status of water stored in the tank of the aircraft 15, and the quantity of water in the tank of the aircraft 15.

The second set of PROP_B data includes: the position of the fire, the wind direction at the site of the fire, at least one terrain feature at the site of the fire, and the position of the firefighters on the ground.

The COP common group includes: the speed of the aircraft 15, the altitude of the aircraft 15, the position of the aircraft 15, the amount of fuel in the aircraft 15, the bombing status of water stored in the tank of the aircraft 15, the amount of water stored in the tank of the aircraft 15, the position of the fire, the wind direction at the site of the fire, at least one field feature at the site of the fire, and the position of the firefighters on the ground.

The common relevant CROP data include: the position of the aircraft 15, the bombing status of water stored in the tank of the aircraft 15, the position of the fire, the wind direction at the site of the fire, at least one terrain feature at the site of the fire, and the position of the fire fighters on the ground.

As an optional supplement, the aeronautical system 10 *c* includes a plurality of aircraft 15 and/or a plurality of ground stations 20.

Each aircraft 15 includes a respective first equipment item 30. The sharing system 25 preferentially includes a first elementary device 40A for each aircraft 15.

In each first elementary device 40A there is then included a respective first obtaining module 45A, a respective first transmission module 60A, and preferentially a respective first enrichment module 63A.

Each first obtaining module 45A, transmission module 60A and enrichment module 63A is configured like the first obtaining module 45A, transmission module 60A and enrichment module 63A described hereinabove.

Similarly, each ground station 20 includes a respective second equipment item 35. The sharing system 25 preferentially includes a second elementary device 40B for each ground station 20. In each second elementary device 40B, is included a second obtaining module 45B, a second transmission module 60B, and preferentially a second enrichment module 63B.

Each second obtaining module 45B, transmission module 60B and enrichment module 63B is configured like the second obtaining module 45B, transmission module 60B and enrichment module 63B described hereinabove.

Thereby, in the second embodiment, the COP common group includes the sets of PROP_A, PROP_B data of each of the first 30 and second 35 equipment items.

Preferentially, the number of aircraft 15 is greater than or equal to three.

During the data sharing process 100, the obtaining 110 and addition 120 steps are iterated for each equipment item 30, 35.

Figure 4:
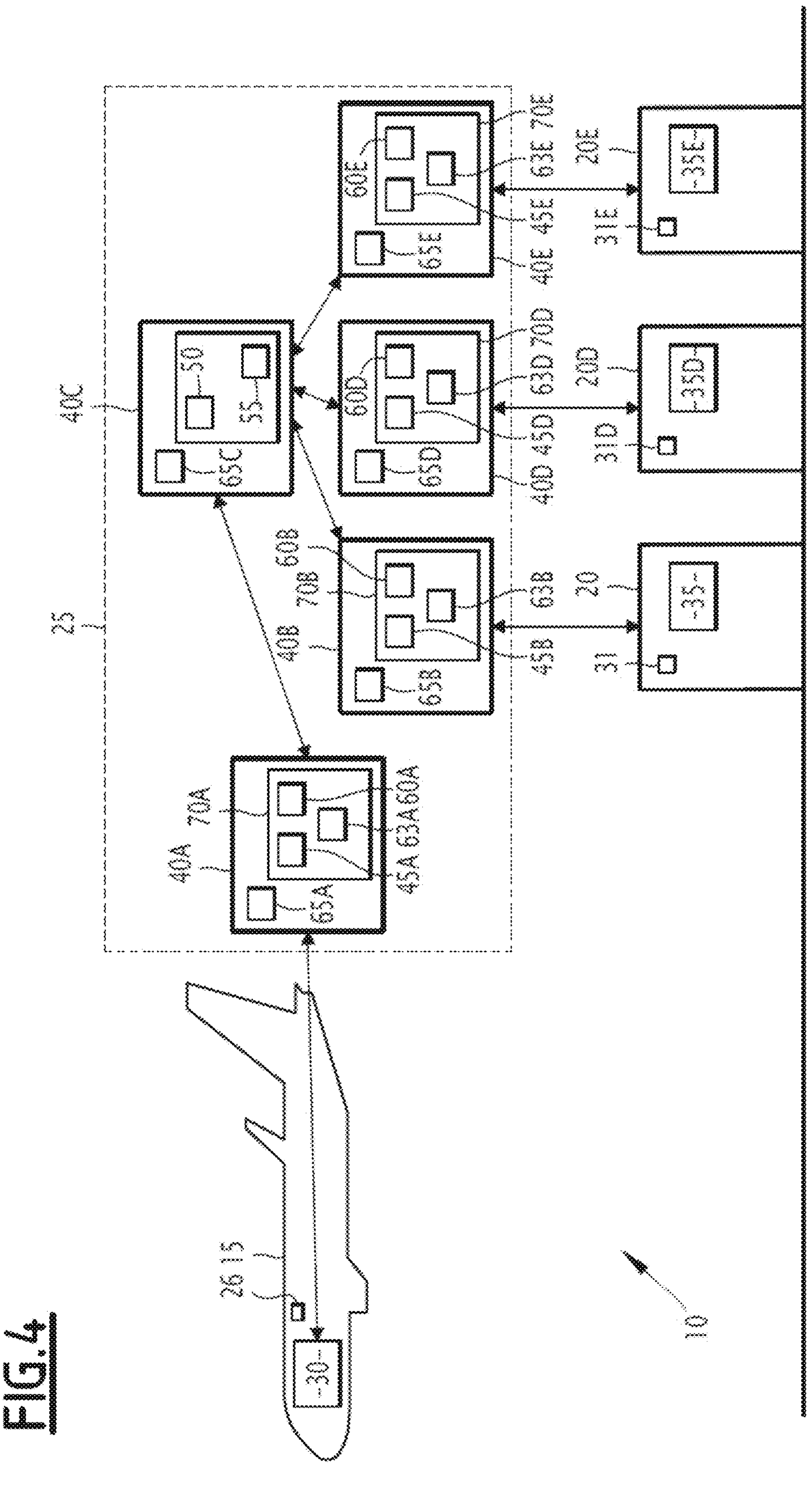
FIG. 4 is a schematic view of an aeronautical system according to a variant of embodiment.
Figure 5:
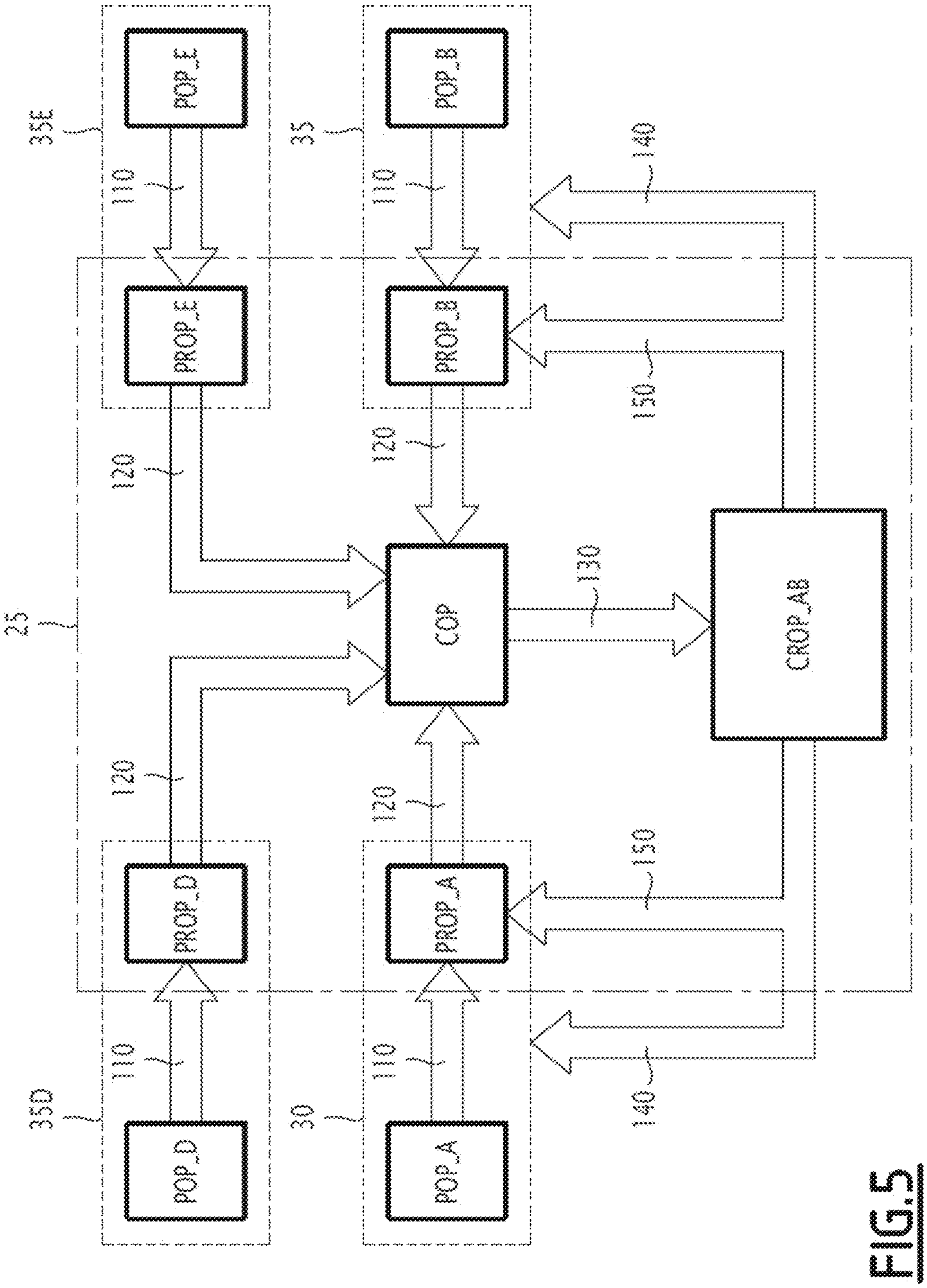
FIG. 5 is a diagram showing data exchanges in a data sharing system included in the aeronautical system shown in FIG. 4.

According to a variant shown in FIGS. 4 and 5, the aeronautical system 10 includes an aircraft 15, a first ground station 20, a second ground station 20D and a third ground station 20E.

The first ground station 20 is analogous to the ground station 20 described hereinabove.

In the first example where the first ground station 20 is an air traffic control tower, the second ground station 20D is an office of an airline fleet manager and the third ground station 20E is a safety service at the destination airport of the aircraft 15 that is expected to receive and make safe the aircraft 15.

In the second example according to which the first ground station 20 is a fire department, the second ground station 20D is a service for coordinating teams of firefighter on the ground, and the third ground station 20E is a service for terrain surveillance by drones, such as rotary-wing drones.

As shown in FIG. 4, each of the first 20, the second 20D and the third 20E ground stations includes respective sensors 31, 31D, 31E and a second equipment item 35, 35D, 35E similar to the equipment items described hereinabove.

The sharing system 25 includes a second elementary device 40B, 40D, 40E corresponding to each ground station 20, 20D, 20E.

The elementary equipment device 40D, 40E associated with each of the second ground station 20D and the third ground station 20E is analogous to the second elementary device 40 associated with the first ground station 20 described hereinabove.

The second elementary device 40D, 40E associated with each of the second 20D and third 20E ground stations includes e.g. a processor 65D, 65E, and a memory 70D, 70E storing an obtaining module 45D, 45E, a second transmission module 60D, 60E, and preferentially an enrichment module 63D, 63E.

According to such variant, the obtaining modules 45A, 45B, 45D, 45E are analogous, i.e. configured to receive the POP_A, POP_B, POP_C, POP_E data from the associated equipment items 30, 35, 35D, 35E, in order to select the individual relevant data from the POP_A, POP_B, POP_C, POP_E data, and to form the associated sets of PROP_A, PROP_B, PROP_C, PROP_E data, from the selected individual relevant data.

According to such variant, the mission is carried out by only a sub-system of the aeronautical system 10. The sub-system includes at least two among the aircraft 15 and the ground stations 20, 20D and 20E.

For example, the mission is carried out:

- only by the aircraft 15 and the first ground station 20,
- only by the aircraft 15 and the second ground station 20D,
- only by the aircraft 15 and the third ground station 20E,
- only by the first ground station 20 and the second ground station 20D,
- only by the first ground station 20 and the third ground station 20E,
- only by the second ground station 20D and the third ground station 20E,
- only by the aircraft 15, the first ground station 20 and the second ground station 20D,
- only by the aircraft 15, the first ground station 20 and the third ground station 20E,
- only by the aircraft 15, the second ground station 20D and the third ground station 20E, or by the first ground station 20, the second ground station 20D and the third ground station 20E.

More particularly, the aeronautical system 10 is e.g. apt to carry out a plurality of missions, each being carried by one of the sub-systems described hereinabove.

In each of the two examples described hereinabove, the aforementioned mission is carried out by the aircraft 15 and the first station 20.

According to such variant, the addition module 50 is analogous to the addition module 50 described hereinabove. Thereby, the COP common group includes the concatenation of the sets of PROP_A, PROP_B, PROP_D and PROP_E data coming from each of the elementary devices 40A, 40B, 40D, 40E.

According to such variant, the filtering module 55 is configured to filter the COP common group so as to determine the at least one common relevant CROP datum for each mission.

Thereby, the at least one common relevant CROP datum corresponds to the sub-system carrying out the mission.

In each of the examples discussed in detail hereinabove, the at least one common relevant CROP datum thus corresponds to the aircraft 15 and to the first ground station 20, the at least one common relevant datum thus bearing the reference CROP_AB.

According to such variant, at least one relevant CROP_AB, CROP_AD, CROP_AE, CROP_BD, CROP_BE, CROP_DE, CROP_ABD, CROP_ABE, CROP_ADE, CROP_BDE datum can be obtained for each of the sub-systems carrying out a respective mission.

According to such variant, the transmission modules 60A, 60B, 60D, 60E of the elementary devices 40A, 40B, 40D, 40E are configured to transmit, to the corresponding equipment items 30, 35, 35D, 35E, only the at least one common relevant CROP_AB datum associated with a sub-system including, the elementary device 40A, 40B, 40D, 40E.

In other words, if the mission is only implemented by the aircraft 15 and the first ground station 20, the transmission modules 60D, 60E are not configured to transmit the corresponding at least one relevant CROP_AB datum to the equipment items 35D, 35E associated with the second 20D and third 20E ground stations.

According to such variant, the enrichment modules 63A, 63B, 63D, 63E of each elementary device 40A, 40B, 40D, 40E are configured to enrich the corresponding set of PROP_A, PROP_B, PROP_D, PROP_E data, only from the common relevant CROP_AB data associated with a sub-system including, the elementary device 40A, 40B, 40D, 40E.

In other words, if the mission is only carried out by the aircraft 15 and the first ground station 20, the enrichment modules 63D, 63E are not configured to enrich the sets of PROP_D, PROP_E data associated with the second 20D and third 20E ground stations from the at least one common relevant CROP_AB datum.

The data sharing method 100 according to such variant is analogous to the method described hereinabove, with the following differences.

During the obtaining step 110, the set of PROP_A, PROP_B, PROP_D, PROP_E data associated with each elementary device is obtained. The hereinabove is illustrated in FIG. 5 by the arrows 110.

During the addition step 120, all sets of PROP_A, PROP_B, PROP_D, PROP_E data are added to the COP common group. The above is illustrated in FIG. 5 by the arrows 120.

During the filtering step 130, the at least one common relevant CROP_AB datum corresponds to the sub-system carrying out the mission, i.e. the aircraft 15 and the first ground station 20 in the examples described hereinabove.

The transmission 140 and enrichment 150 steps are implemented only for the sub-system carrying out the mission, i.e. for the aircraft 15 and the first ground station 20 in the examples described hereinabove. In FIG. 5, the above is represented by an absence of an arrow 140, 150 linking the at least one common relevant CROP_AB datum and the second aeronautical equipment item 35D, 35E associated with the second ground station 20D and the third ground station 25E.

According to such variant, the elements of the aeronautical system 10 not carrying out the mission are not overloaded with information that does not concern the elements.

The present invention thus improves the level of knowledge of the equipment items 30, 35; 30, 35, 35D, 35E and/or associated users, by means of the push data mechanism, without overloading each equipment item 30, 35; 30, 35, 35D, 35E and/or user.

Indeed, only the data considered as relevant for each user and/or equipment item are transmitted, thus limiting the data load to be processed.

Furthermore, the automatic push data mechanism makes it possible to anticipate the needs of the of aeronautical equipment and/or users, thereby saving time for the equipment items and/or users for the implementation of corrective actions. The above is particularly advantageous in the context of critical situations during which the reaction time is often a limiting factor.

In addition, the optional enrichment step allows each equipment item 30, 35; 30, 35, 35D, 35E involved in the mission to take advantage of data from other equipment items 30, 35; 30, 35, 35D, 35E, e.g. for inferring new data that require a complete view of the aeronautical system 10.

Furthermore, the distribution of the sharing system 25 and the fact that same is not centralized in a single device ensure that the system is more robust against potential external attacks.

In addition, the optional sub-steps during the step 110 of obtaining the set of PROP_A, PROP_B; PROP_A, PROP_B, PROP_D, PROP_E data, make it possible to perform a first limitation of the quantity of data by not taking into account any data which is not relevant for the equipment item and/or the user thereof. Thereby, the amount of data in the COP common group is limited and the processing of the data is accelerated.

The invention claimed is:

1. A method for controlling the flight path of an aircraft, by an electronic data system that shares data between equipment items, each equipment item comprising a display screen, at least one equipment item being comprised in an aircraft and another equipment item being comprised in an air traffic control tower, the aircraft carrying out a flight mission to manage an engine failure during a flight of the aircraft, the method comprising:

obtaining (i) a set of data from the equipment items comprised in the aircraft comprising a speed of the aircraft, an altitude of the aircraft, a position of the aircraft, a flight time to an initial destination of the aircraft, a quantity of fuel in the aircraft, a pressure in each engine of the aircraft, a power of each engine of the aircraft, a ventilation status of a cabin of the aircraft, and an element relating to the passengers of the aircraft, and (ii) a set of data from the equipment item comprised in the aircraft control tower comprising an indication of traffic in a zone around the aircraft, a delimitation of an area prohibited for overflying, a radio communication channel with a pilot of the aircraft, and a meteorological information associated with the environment of the aircraft;

adding the set of data to a common group, the common group including data common to all equipment items;

filtering the data of the common group via filtering rules specific to the mission to obtain the data needed for calculating a flight plan following the engine failure to be implemented by the aircraft, so as to determine second relevant data, comprising the speed of the aircraft, the altitude of the aircraft, the position of the aircraft, the flight time to an initial destination of the aircraft, the quantity of fuel in the aircraft, the pressure in each engine of the aircraft, the power of each engine of the aircraft, the indication of traffic in a zone around the aircraft, and the delimitation of an area prohibited for overflying; and transmitting flight commands, calculated from the second relevant data, from the air traffic control tower to the aircraft.

2. The method according to claim 1, wherein said obtaining and said adding are iterated for each equipment item, prior to said filtering, and during said adding the respective set of data coming from each equipment item is added to the same group of data group common to all equipment items.

3. The method according to claim 1, wherein at least two of the equipment items are associated with the mission, the method further comprising, following said transmitting and for the at least two other equipment items associated with the mission, an enrichment operation during which the at least one secondary relevant datum is added to the respective set of data of a further equipment item.

4. A non-transitory computer-readable medium comprising instructions which, when executed by a computer, cause the computer to implement a method according to claim 1.

5. An electronic data sharing system between equipment items, at least one equipment item being comprised in an aircraft and another equipment item being comprised in an air traffic control tower, each equipment item comprising a display screen, the aircraft carrying out a flight mission to manage an engine failure during a flight of the aircraft, the electronic data sharing system comprising for one of the equipment items:

an obtaining module obtaining (i) a set of data from the equipment items comprised in the aircraft comprising a speed of the aircraft, an altitude of the aircraft, a position of the aircraft, a flight time to an initial destination of the aircraft, a quantity of fuel in the aircraft, a pressure in each engine of the aircraft, a power of each engine of the aircraft, a ventilation status of a cabin of the aircraft, and an element relating to the passengers of the aircraft, and (ii) a set of data from the equipment item comprised in the aircraft control tower comprising an indication of traffic in a zone around the aircraft, a delimitation of an area prohibited for overflying, a radio communication channel with a pilot of the aircraft, and a meteorological information associated with the environment of the aircraft;

an addition module adding the set of data to a common group, the common group including data common to all equipment items;

a filtering module filtering the data of the common group via filtering rules specific to the mission, to obtain the data needed for planning a flight plan following the engine failure to be implemented by the aircraft, so as to determine second relevant data, comprising the speed of the aircraft, the altitude of the aircraft, the position of the aircraft, the flight time to an initial destination of the aircraft, the quantity of fuel in the aircraft, the pressure in each engine of the aircraft, the power of each engine of the aircraft, the indication of traffic in a zone around the aircraft, and the delimitation of an area prohibited for overflying; and a transmission module transmitting flight commands, calculated from the second relevant data, from the air traffic control tower to the aircraft.

6. An electronic sharing system according to claim 5, wherein the electronic sharing system is a decentralized system comprising a plurality of elementary electronic devices, said obtaining, adder, filter and transmitter modules being comprised in at least two distinct elementary electronic devices.

* * * * *